(12) United States Patent
Laing et al.

(10) Patent No.: US 10,550,239 B2
(45) Date of Patent: Feb. 4, 2020

(54) SLIDING ENGINE COMPONENT

(71) Applicants: Mahle International GmbH, Stuttgart (DE); Mahle Engine Systems UK Limited, Rugby (GB)

(72) Inventors: Ian Laing, Warwickshire (GB); David Latham, Hertfordshire (GB); Roger Gorges, West Midlands (GB)

(73) Assignees: Mahle International GmbH (DE); Mahle Engine Systems UK Limited (GB)

( * ) Notice: Subject to any disclaimer, the term of this patent is extended or adjusted under 35 U.S.C. 154(b) by 0 days.

(21) Appl. No.: 15/326,636

(22) PCT Filed: Jul. 7, 2015

(86) PCT No.: PCT/EP2015/065480
§ 371 (c)(1),
(2) Date: Jan. 16, 2017

(87) PCT Pub. No.: WO2016/008770
PCT Pub. Date: Jan. 21, 2016

(65) Prior Publication Data
US 2017/0204245 A1 Jul. 20, 2017

(30) Foreign Application Priority Data
Jul. 17, 2014 (GB) .................................. 1412732.8

(51) Int. Cl.
| | | |
|---|---|---|
| F16C 33/20 | (2006.01) | |
| F16C 9/02 | (2006.01) | |
| F16C 9/00 | (2006.01) | |
| B32B 27/20 | (2006.01) | |
| B32B 15/08 | (2006.01) | |
| C08K 3/04 | (2006.01) | |
| C08K 9/04 | (2006.01) | |
| C08K 9/00 | (2006.01) | |

(52) U.S. Cl.
CPC .................. *C08K 3/04* (2013.01); *C08K 9/04* (2013.01); *F16C 9/02* (2013.01); *F16C 33/201* (2013.01); *C08K 2201/002* (2013.01); *C08K 2201/011* (2013.01); *F16C 2360/22* (2013.01)

(58) Field of Classification Search
None
See application file for complete search history.

(56) References Cited

U.S. PATENT DOCUMENTS

| | | | | |
|---|---|---|---|---|
| 2005/0157964 A1* | 7/2005 | Kawagoe | .................. | F16C 9/00 384/276 |
| 2011/0017955 A1* | 1/2011 | Zhamu | ............... | C08G 59/5033 252/511 |
| 2011/0317955 A1* | 12/2011 | Mayston | .................. | C08L 79/08 384/625 |
| 2013/0136684 A1* | 5/2013 | Wu | ........................ | B82Y 30/00 423/448 |
| 2015/0240118 A1* | 8/2015 | Wu | ...................... | C09D 179/04 524/157 |
| 2017/0037257 A1* | 2/2017 | Yang | ...................... | C09D 5/084 |

FOREIGN PATENT DOCUMENTS

| | | | |
|---|---|---|---|
| DE | 102012215668 A1 * | 3/2014 | ............ F16C 33/043 |
| EP | 2592290 A1 | 5/2013 | |
| GB | 2501926 A | 11/2013 | |
| JP | 2012-215206 A | 11/2012 | |
| JP | 2013203905 A | 10/2013 | |
| WO | WO-2010066396 A1 | 6/2010 | |
| WO | WO-2013026827 A1 | 2/2013 | |

OTHER PUBLICATIONS

Machine translation of DE-102012215668-A1 (no date).*
Japan Office Action dated Nov. 20, 2018 for copending application No. 2016-560894.
English Abstract for JP2013203905A.
Japan Office Action dated Jun. 4, 2019 for copending application No. 2016-560894.
English Abstract for JP2012-215206A.

* cited by examiner

*Primary Examiner* — Michael J Feely
(74) *Attorney, Agent, or Firm* — Fishman Stewart PLLC

(57) ABSTRACT

A sliding engine component may include a plastic polymer-based composite layer on a substrate. The composite layer may include a matrix of plastic polymer-based material, and functionalised graphene nano platelets distributed throughout the matrix.

19 Claims, 1 Drawing Sheet

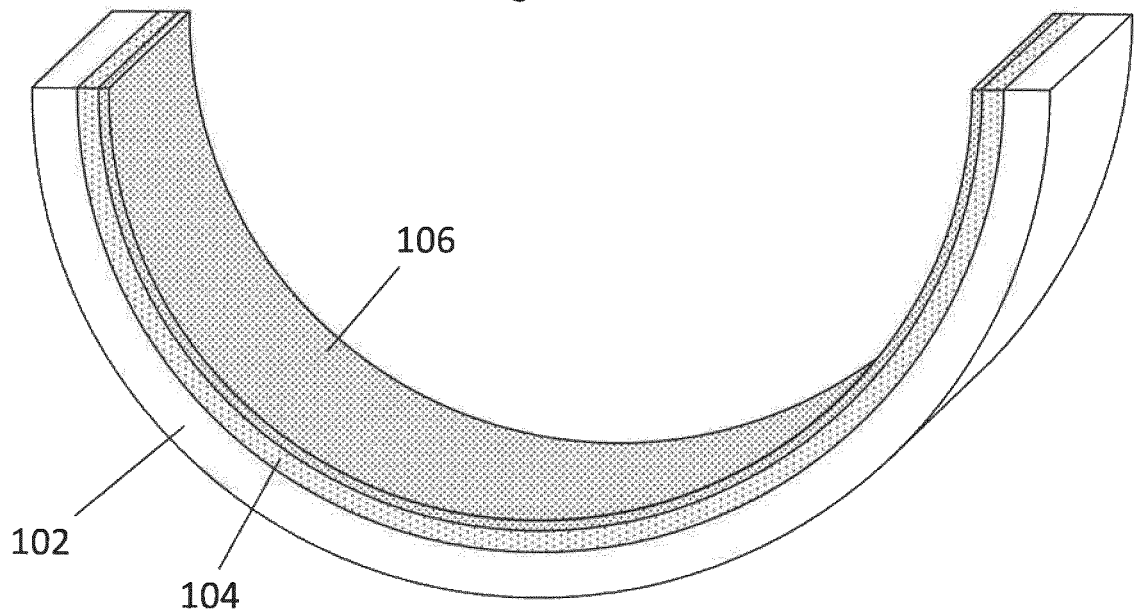
Figure 1A
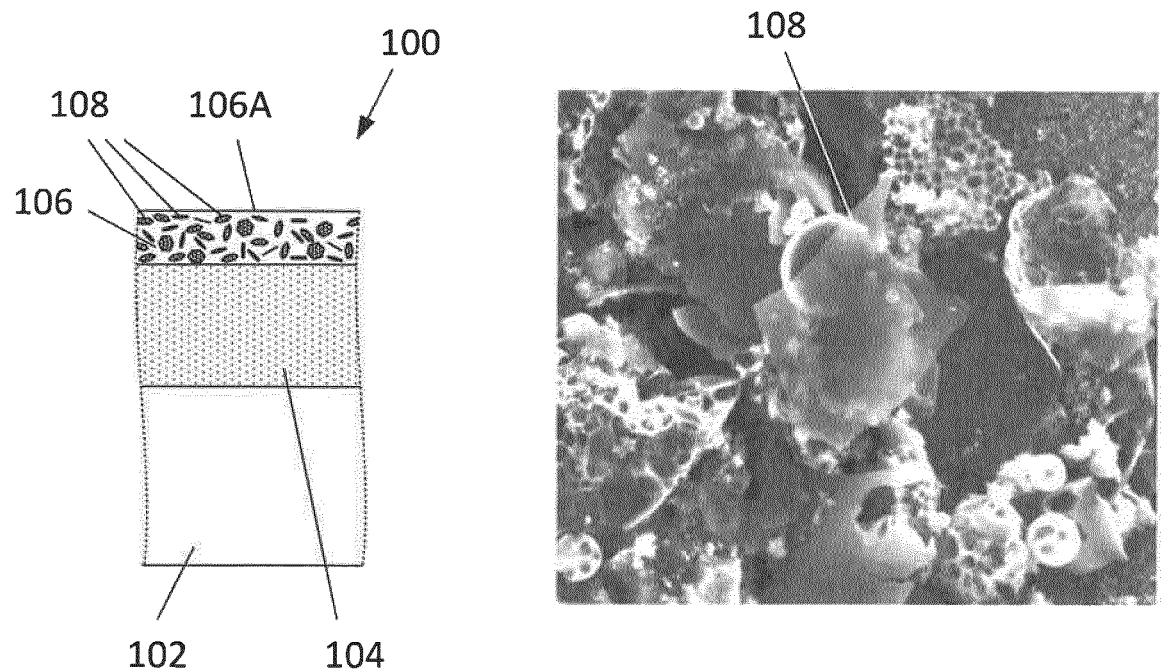
Figure 1B
Figure 2

SLIDING ENGINE COMPONENT

CROSS-REFERENCE TO RELATED APPLICATION

This application claims priority to British Patent Application No. GB 1412732.8, filed Jul. 17, 2014, and International Application No. PCT/EP2015/065480, filed Jul. 7, 2015, both of which are hereby incorporated by reference in their entirety.

TECHNICAL FIELD

The present invention relates to sliding engine components having a plastic polymer-based bearing "overlay" layer, and in particular to sliding engine components for sliding bearing assemblies such as bearing shells, bushes, bearing surfaces of crankshafts, bearing surfaces of camshafts, bearing surfaces of connecting rods, thrust washers, flanges, bearing surfaces of a bearing block, bearing surfaces of a bearing cap, and piston assembly components such as piston rings, piston skirts, and cylinder walls and cylinder liners.

BACKGROUND

In internal combustion engines, the bearing assemblies typically each comprise a pair of half bearings retaining a crankshaft that is rotatable about an axis. Each half bearing is a hollow generally semi-cylindrical bearing shell, and typically at least one is a flange half bearing, in which the bearing shell is provided with a generally semi-annular thrust washer extending outwardly (radially) at each axial end. In other bearing assemblies it is also known to use an annular or circular thrust washer.

The bearing surfaces of bearing shells generally have a layered construction, in which a substrate comprising a strong backing material is coated with one or more layers having preferred tribological properties to provide a bearing surface that faces a cooperating moving part, e.g. a crankshaft journal, in use. In known bearing shells, a substrate comprises a backing coated with a lining layer, and the substrate is in turn coated with an overlay layer.

The strong backing material may be steel, and may have a thickness of about 1 mm or more. A known lining layer may be a copper-based material (e.g. copper-tin bronze) or an aluminium-based material (e.g. aluminium or aluminium-tin alloy), which is adhered to the substrate (either directly to the backing or to an optional interlayer). The thickness of the lining layer is generally in the range from about 0.05 to 0.5 mm (e.g. 300 µm of copper-based alloy consisting of 8% wt Sn, 1% wt Ni, and balance of Cu, apart from incidentally impurities). The overlay layer may be 6 to 25 µm of a plastic polymer-based composite layer or a metal alloy layer (e.g. a tin-based alloy overlay).

For example, WO2010066396 describes a plastic polymer-based composite material for use as an overlay layer on a copper- or aluminium-based lining layer, which is in turn bonded onto a steel backing. The described overlay layer comprises a matrix of a polyamide-imide plastic polymer material, having distributed throughout the matrix (% vol proportions are specified with respect to the content of the overlay layer after the polymer has been cured): from 5 to less than 15% vol of a metal powder; from 1 to 15% vol of a fluoropolymer particulate, the balance being the polyamide-imide resin apart from incidental impurities (e.g. a layer of 12 µm thickness that comprises 12.5% vol Al, 5.7% vol PTFE particulate, 4.8% vol silane, <0.1% vol other components, and balance (approximately 77% vol) polyamide-imide).

WO2010066396 describes that prior to deposition, the deposition mixture comprises polyamide-imide plastic polymer in a solvent system of N-methyl-2-pyrrolidone (NMP) and xylene, and the solid particulate is suspended in the deposition mixture. Alternatively, it is also known to use a solvent mixture of N-ethyl-2-pyrrolidone (NEP) and xylene. In each case, a small proportion of xylene (e.g. 1 to 2% wt of the deposition mixture) is used to enhance the stability of particulate within the deposition mixture. Such plastic polymer-based overlay layers may be deposited by various different methods, including spraying, pad printing (an indirect offset printing process, e.g. in which a silicone pad transfers a layer of the plastic polymer composite material onto the sliding bearing substrate), screen printing, or by a transfer rolling process. A layer may be deposited as a single coating, or may be built-up as a plurality of separate coatings, with a flash off phase carried out following the deposition of a coating, to remove solvent and enhance the structural integrity of the coating, in particular to prevent the sub-layer from running and to enable the deposition of a further coating, prior to curing.

After the deposition of the overlay layer has been completed, the entire polymer layer is thermally cured by heating to set the polymer-based layer, by inducing cross-linking of the polymer matrix. The overlay layer may be cured at 140 to 280° C. for a duration that may range from a few minutes to a few hours (e.g. 10 minutes to 2 hours). WO2010066396 describes an exemplary final cure of 190° C. for 30 minutes.

SUMMARY

According to a first aspect, there is provided a sliding engine component having a plastic polymer-based composite layer on a substrate, the composite layer comprising: a matrix of plastic polymer-based material having distributed throughout the matrix; functionalised graphene nano platelets.

According to a second aspect, there is provided an engine comprising a sliding engine component according to the first aspect.

According to a third aspect, there is provided a flat sheet element for forming a sliding engine component for an internal combustion engine according to the first aspect.

Being very thin, the functionalised graphene nano platelets have a particularly high surface area (per unit mass) for bonding with the matrix, and the bonding performance is also substantially enhanced by the functionalisation of the graphene nano platelets. Accordingly, advantageously the functionalised graphene nano platelets provide particularly enhanced structural reinforcement of the composite layer. Further, in use, the planar shape of the functionalised graphene nano platelets provides enhanced resistance to the spreading of fractures through the composite layer (e.g. tensile fatigue cracks spreading from the bearing surface), with the propagation of a fracture being obstructed by graphene nano platelets lying transversely to the direction of propagation. Yet further, being so thin, a given mass of functionalised graphene nano platelets provides a particularly high number of functionalised graphene nano platelets within the composite layer, providing an enhanced lubrication performance, in the event of direct contact with the cooperating moving part, in use within a bearing assembly. Additionally, the functionalised graphene nano platelets may be easily dispersed within the deposition mixture, which is deposited onto the substrate before being cured to form the composite layer.

The functionalised graphene nano platelets may comprise graphene nano platelets that are functionalised with —COOH functional groups. Advantageously, the —COOH functional groups reinforce the composite layer by bonding to —$NH_2$ functional groups in the matrix of plastic polymer-based material (e.g. polyamide-imide resin).

The functionalised graphene nano platelets may comprise graphene nano platelets that are functionalised with —$NH_2$ functional groups. Advantageously, the —$NH_2$ functional groups reinforce the composite layer by bonding to —COOH functional groups in the matrix of plastic polymer-based material (e.g. polyamide-imide resin). Advantageously, the —$NH_2$ functional groups on the functionalised graphene nano platelets are small, and due to low steric hinderance they may provide enhanced bonding to —COOH functional groups in the matrix.

The functionalised graphene nano platelets may comprise graphene nano platelets that are functionalised with both —COOH and —$NH_2$ functional groups. Advantageously, the —COOH functional groups of the functionalised graphene nano platelets are also attracted to bond with the —$NH_2$ functional groups of other functionalised graphene nano platelets, further reinforcing the composite layer.

The functionalised graphene nano platelets may comprise graphene nano platelets that are partially functionalised.

The sliding engine component may comprise 0.01 to 4% wt functionalised graphene nano platelets.

The sliding engine component may comprise 0.1 to 2% wt functionalised graphene nano platelets. The sliding engine component may comprise 0.1 to 0.5% wt functionalised graphene nano platelets.

The functionalised graphene nano platelets may have a maximal planar dimension of up to 20 µm. The functionalised graphene nano platelets may have a maximal planar dimension of up to 10 µm. The functionalised graphene nano platelets may have a minimum planar dimension of 1 µm.

The functionalised graphene nano platelets may have a thickness of less than 50 nm.

The functionalised graphene nano platelets may comprise a mean average of up to 20 layers.

The functionalised graphene nano platelets may comprise a mean average of up to 4 layers. Advantageously, functionalised graphene nano platelets having up to 4 layers provide the greatest enhancement in strength of the composite layer.

The functionalised graphene nano platelets may comprise a mean average of at least 5 and up to 10 layers. Functionalised graphene nano platelets having 5 layers to 10 layers provide an advantageous balance between the enhancement in strength of the composite layer that is provided by functionalised graphene nano platelets having only a small number of layers, and the enhancement in the lubrication performance of the composite layer, in the event of direct contact with a cooperating moving part (e.g. a crankshaft journal), that is provided by a greater number of layers.

The functionalised graphene nano platelets may comprise a mean average of at least 11 layers and up to 20 layers. Advantageously, functionalised graphene nano platelets having at least 11 layers provide the greatest enhancement in the lubrication performance of the composite layer, in the event of direct contact with a cooperating moving part (e.g. a crankshaft journal).

The composite layer may comprise functionalised graphene nano platelets selected from a plurality of sub-groups selected from the group consisting of the sub-groups: having a mean average of up to 4 layers; having a mean average of at least 5 layers and up to 10 layers; and, having a mean average of at least 11 layers and up to 20 layers.

The plastic polymer-based material may be selected from the group consisting of polyamide-imide resin, acrylate resin, epoxy resin, fluoropolymer and polybenzimidazole (PBI).

The composite layer may have a thickness of 6 to 25 µm.

The sliding engine component may be a sliding bearing assembly component selected from the group consisting of: bearing shells, bushes, bearing surfaces of crankshafts, bearing surfaces of camshafts, bearing surfaces of connecting rods, thrust washers, flanges, bearing surfaces of a bearing block, bearing surfaces of a bearing cap, piston rings, piston skirts, cylinder walls and cylinder liners.

The composite layer is deposited onto the substrate as a deposition mixture. The deposition mixture of plastics polymer-based resin material and carbon nanostructures may further comprise a solvent system, which may facilitate forming the deposition mixture. The solvent system can be employed in various proportions in order to achieve a particular desired viscosity of mixture for coating onto the substrate. The solvent system may comprise at least one solvent selected from the group consisting of N-methyl-2-pyrrolidone and N-ethyl-2-pyrrolidone, and optionally water and/or a small proportion of xylene. The invention is not limited to cases in which the polyamide-imide polymer is fully dissolved in the solvent system, it may only be partially dissolved or it may not be dissolved. It such cases it would be present as a suspended solid, although this is less preferred. The deposition mixture may therefore be a solution, a suspension or an emulsion or a mixture of any two or more of these forms.

The composite layer may comprise dry lubricant particulate selected from the group consisting of: a fluoropolymer, $MoS_2$, graphite or h-BN.

The composite layer may comprise xylene (i.e. o-xylene, p-xylene, m-xylene or a mixture of any two or all three thereof).

The composite layer may also contain an addition of a silane material. Silane materials have been found to promote stability of the polyimide/amide matrix and have also been found to promote adhesion of the polyimide/amide resin material to the substrate. A suitable silane material may be a gamma-aminopropyltriethoxysilane (e.g. 3-aminopropyl-triethoxysilane). A suitable alternative silane material may comprise bis-(gamma-trimethoxysilpropyl)amine.

The composite layer may comprise hard particulate selected from the group consisting of: aluminium powder, SiC, WC, c-BN, and $CaCO_3$. The hard particulate may comprise aluminium flakes.

BRIEF DESCRIPTION OF THE DRAWINGS

Embodiments of the invention are further described hereinafter with reference to the accompanying drawings, in which:

FIG. 1A shows a bearings shell, which is an embodiment of a sliding engine component according to the present invention;

FIG. 1B shows a cross-sectional view through part of the bearing shell of FIG. 1A; and FIG. 2 shows a scanning electron microscope photograph of an exemplary functionalised graphene nano platelet for use in an overlay layer according to the present invention.

DETAILED DESCRIPTION

FIG. 1A schematically illustrates a bearing shell 100 (e.g. an exemplary sliding engine component) in the form of a hollow semi-cylindrical bearing shell, which is also commonly referred to as a "half bearing", and FIG. 1B illustrates a cross-sectional view through a part of the bearing shell.

The half bearing 100 has a plastic-polymer based overlay layer (a composite layer) 106 on a substrate comprising a strong backing 102 of steel. The substrate may optionally comprise further layers between the backing 102 and the overlay layer 106. In the illustrated example, an optional lining layer 104 is shown, which may be a copper-based material (e.g. copper-tin bronze), an aluminium-based material (e.g. aluminium or aluminium-tin alloy), or a further polymer based layer, which is adhered to the steel backing 102.

The backing 102 provides strength and resistance to deformation of the bearing shell 100, when it is assembled in a main bearing housing or in a connecting rod big end, for example.

The substrate comprises an optional lining layer 104 on the backing 102, to provide suitable bearing running properties, if the overlay layer 106 should become worn through, for any reason.

The overlay layer 106 is configured to provide a running surface (i.e. sliding surface) over the lifetime of the vehicle containing the bearing shell 100, facing a cooperating moving part in a bearing assembly. In use, within an assembled bearing, the overlay layer 106 of the bearing shell 100 and a journaled shaft mutually cooperate, with an intervening film of lubricating oil. The overlay layer 106 is particularly suited to accommodate small misalignments between the bearing surface and the shaft journal (conformability) and is able to receive and embed dirt particles circulating in the lubricating oil supply, so as to prevent scoring or damage to the journal surface by the debris (dirt embedability). The overlay layer 106 also provides suitable tribological properties between the bearing 100 and the shaft journal, if a failure of the intervening oil film should occur.

The overlay layer 106 is a composite layer comprising a matrix of plastic polymer material, throughout which functionalised graphene nano platelets 108 are distributed. The overlay layer 106 may also comprise (optional) further particulate distributed throughout the matrix of the plastic polymer material (not illustrated), e.g. solid lubricant, and hard particulate. In the illustrated example, the plastic polymer matrix material in the overlay layer 106 is a polyamide-imide resin.

The functionalised graphene nano platelets 108 are small sheets of graphene having a mean average number of atomic layers from 1 to approximately 20 atomic layers. The functionalised graphene nano platelets have a particularly high surface area for bonding to the matrix material, and thereby reinforcing the composite overlay layer. In use, the functionalised graphene nano platelets advantageously resist the spreading of fatigue cracks through the composite overlay layer, which may be initiated at the bearing surface 106A.

The number of atomic layers in each functionalised graphene nano platelet 108 affects the performance benefit provided by their inclusion. Functionalised graphene nano platelets with a lower number of atomic layers (e.g. up to 5 layers) provide a particularly enhancement to the strength of the composite layer. The functionalised graphene nano platelets with a higher number of atomic layers (e.g. 11 to 20 layers) provides a particular enhancement to the lubrication properties of the composite layer. An intermediate number of atomic layers (e.g. 6 to 10 layers) may provide an advantageous balance between strength and lubrication properties of the composite layer.

The nano platelets have a mean average thickness of less than 50 nm.

The maximal planar dimension of the nano platelets (i.e. the largest dimension in the plane of the nano platelet) has a value of 20 µm, and preferably 10 µm, which advantageously provides particularly enhanced strength in the composite overlay layer. The minimum planar dimension of the nano platelets is 1 µm, which advantageously provides functionalised graphene nano platelets with particularly enhanced dispersion performance, being less susceptible to agglomeration.

The addition of functionalised graphene nano platelets advantageously enhances the performance of the composite layer. The functionalised graphene nano platelets provide improved seizure performance, by providing a lubrication function, where exposed at the bearing surface. Further, the functionalised graphene nano platelets enhance the thermal conductivity of the composite layer, enabling enhanced thermal dissipation through the composite layer. Yet further, the functionalised graphene nano platelets improve fatigue performance, obstructing propagation of fractures in the composite overlay layer, and reduce material wear of the composite overlay layer.

The graphene nano platelets are functionalised with —COOH functional groups and/or —$NH_2$ functional groups. The functionalisation of the graphene nano platelets enhances the dispersion of the platelets within the deposition mixture, prior to deposition of the plastic polymer-based material, by reducing attraction between the platelets. Advantageously, reducing agglomeration of the graphene nano platelets in the deposited mixture enhances the uniformity of the distribution of platelets in the deposited layer.

The functionalised graphene nano platelets 108 are partially functionalised (i.e. only a proportion of the active sites on the outer surface of each platelet are occupied by a functional group). Advantageously, partial functionalisation provides good dispersion performance, whilst also providing good bonding performance to the matrix material.

The overlay layer 106 comprises 0.01 to 4% wt, and preferably 0.1 to 2% wt or 0.1 to 0.5% wt, of functionalised graphene nano platelets (% wt proportions are specified with respect to the content of the formed layer, after it has been cured).

Advantageously, the plastic polymer-based composite layer comprising functionalised graphene nano platelets provides enhanced fatigue resistance and wear resistance compared with prior art layers, whilst still permitting good embedability of any particulate carried in the oil that lubricates the bearing, in use. Exposed functionalised graphene nano platelets, at the bearing surface, increase lubricious properties of the free surface, reducing friction of the composite layer, in the event that the journaled shaft contacts the bearing surface, for example when the bearing is not fully supplied with lubrication oil, which can occur when an engine starts and before the lubrication oil has risen to working pressure.

FIG. 2 shows a scanning electron microscope photograph of an exemplary functionalised graphene nano platelet 108 for use in an overlay layer 106.

Prior to functionalisation, the graphene comprises one or more one-atom-thick planar layers of carbon atoms packed in a hexagonal crystal lattice with each carbon being $sp^2$ hybridised, and forming a bond with each of three neighbouring carbon atoms in a trigonal planar configuration. Once functionalised a layer typically becomes non-planar (e.g. with periodically distributed functional groups, a layer may become puckered or corrugated), particularly in those regions of the layer to which the functionalisation is attached. Typically, any carbon atom in the lattice which is functionalised will be $sp^3$ hybridised, forming a bond with each of three neighbouring carbon atoms and one further bond to the functional group (e.g. to the —$NH_2$ or —COOH group), and thus adopts a non-planar tetrahedral configuration.

The functionalised graphene nano platelets may be formed by the process of plasma functionalisation, in which active sites on the planar surface and/or edges of the nano platelets are populated with functional groups, providing complete or partial saturation of the available active sites on the outside of the nano platelets.

Nano platelets functionalised with —COOH and/or —$NH_2$ functional groups are particularly suited to chemically bonding with a polyamide-imide resin matrix, providing particularly enhanced reinforcement of the composite overlay layer.

The plastic polymer-based composite layer may also contain an addition of a silane material. Silane materials have been found to promote stability of the polyamide-imide matrix, promote wetting and thus adhesion of the polyamide-imide resin material to the substrate and any particulate, and promote cross-linking of the polyamide-imide matrix during curing. A suitable silane material may be gamma-aminopropyltriethoxysilane (e.g. 3-aminopropyltriethoxysilane), and an addition in the range of 3 to 6% vol may be made to the deposition mixture. A suitable alternative silane material may comprise bis-(gamma-trimethoxysilpropyl)amine.

The plastic polymer-based overlay layer may further comprise a dry lubricant particulate. A dry lubricant particulate may be included in the plastic polymer-based layer for its beneficial effect on material frictional properties and its self-lubricating effect. The dry lubricant particulate may be fluoropolymer, $MoS_2$, graphite or h-BN (hexagonal crystalline boron nitride). Particle size of the dry lubricant particulate desirably lies in the range from 1 to 5 μm, and a size range of 2 to 4 μm is preferred (e.g. polytetrafluoroethylene (PTFE) or fluorinated ethylene-propylene (FEP)). In the case that the overlay layer is deposited from a suspension comprising a fluoropolymer particulate, the solvent system preferably also comprises 1 to 2% wt xylene, which stabilises the fluoropolymer particulate suspended within the deposition mixture.

To enhance wear resistance, the composite layer may further comprise from hard particulate selected from the group consisting of: aluminium powder (e.g. aluminium flakes), SiC, WC, c-BN (cubic crystalline boron nitride), and $CaCO_3$.

The composite overlay layer 106 is formed by depositing a deposition mixture comprising the plastic polymer material dissolved in a solvent system, in which the functionalised graphene nano platelets (and any other particulate) are suspended. In the illustrated example, the solvent system comprises N-ethyl-2-pyrrolidone (NEP) and/or N-methyl-2-pyrrolidone (NMP), a small proportion of xylene solvent, and optionally water. The solvent system can be employed in various proportions, relative to the plastic polymer and functionalised graphene nano platelets (and any other suspended solid particulate) in order to achieve a particular desired viscosity of the deposition mixture for coating onto the substrate. Prior to deposition, the functionalised graphene nano platelets (and any other suspended solid particulate) are preferably maintained in suspension by agitation of the deposition mixture. The solvent system facilitates forming and depositing the mixture, and the proportion of solvent to polymer (and any particulate) in the mixture is chosen to optimise deposition performance.

The overlay layer is deposited onto the substrate by a spray coating, from a spray gun. Alternatively, the plastic polymer-based composite layer may be deposited by a screen printing (i.e. through a mask), a pad printing process (i.e. an indirect offset printing process, e.g. in which a silicone pad transfers a patterned layer of the plastic polymer composite material onto the sliding bearing substrate), or by a transfer rolling process.

Although the overlay layer may be deposited in a single deposition step, for greater thicknesses, the overlay layer may alternatively be built up by deposition of a succession of sub-layers, with a flash off stage provided between successive depositions to remove solvent from the sub-layers.

Curing the deposited plastic polymer-based composite layer induces molecular cross-linking of molecules in the plastic polymer. Curing also removes substantially all solvent from the overlay layer, including any residual solvent from flashed off sub-layers.

The cured plastic-polymer overlay layer 106 may have a thickness of 4 to 12 μm, with thicker layers being formed from a succession of sub-layers. For example, an overlay layer 106 of 8 to 12 μm thickness may be built up by the deposition of two or three sub-layers.

Although illustrated in the figures in relation to a half bearing shell, the present invention equally applies to other sliding engine components, including semi-annular, annular or circular thrust washers, and bushes.

The figures provided herein are schematic and not to scale.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A sliding engine component comprising a plastic polymer-based composite layer on a substrate, the composite layer including:
a matrix of plastic polymer-based material;
a silane material; and
functionalised graphene nano platelets distributed throughout the matrix;
wherein the functionalised graphene nano platelets comprise graphene nano platelets that are partially functionalised;
wherein the silane material is one of gamma-aminopropyltriethoxysilane or bis-(gamma-trimethoxysilpropyl)amine; and
wherein the plastic polymer material is a polyamide-imide resin.

2. A sliding engine component according to claim 1, wherein the functionalised graphene nano platelets comprise graphene nano platelets that are functionalised with —COOH functional groups.

3. A sliding engine component according to claim 1, wherein the functionalised graphene nano platelets comprise graphene nano platelets that are functionalised with —NH$_2$ functional groups.

4. A sliding engine component according to claim 1, wherein the composite layer comprises 0.01 to 4% wt functionalised graphene nano platelets.

5. A sliding engine component according to claim 4, wherein the silane material is in a range of 3% to 6% volume of the composite layer.

6. A sliding engine component according to claim 1, wherein the composite layer comprises 0.1 to 2% wt functionalised graphene nano platelets.

7. A sliding engine component according to claim 1, wherein the functionalised graphene nano platelets have a maximal planar dimension of up to 20 µm.

8. A sliding engine component according to claim 7, wherein the functionalised graphene nano platelets have a thickness of less than 50 nm.

9. A sliding engine component according claim 1, wherein the functionalised graphene nano platelets comprise a mean average of up to 20 layers.

10. A sliding engine component according to claim 9, wherein the functionalised graphene nano platelets comprise a mean average of up to 4 layers.

11. A sliding engine component according to claim 9, wherein the functionalised graphene nano platelets comprise a mean average of at least 5 layers and up to 10 layers.

12. A sliding engine component according to claim 9, wherein the functionalised graphene nano platelets comprise a mean average ranging from at least 11 layers to 20 layers.

13. A sliding engine component according claim 1, wherein the sliding engine component is one of a half bearing shell, a thrust washer, and a bearing bush.

14. A sliding engine component according claim 1, wherein the gamma-aminopropyltriethoxysilane is 3-aminopropyltriethoxysilane.

15. A sliding engine component according to claim 1, wherein the silane material is in a range of 3% to 6% volume of the composite layer.

16. A sliding engine component according to claim 1, wherein the composite layer has a thickness of 4 µm to 12 µm.

17. A sliding engine component according to claim 16, wherein the thickness is 8 µm to 12 µm and is built up by a deposition of two or three sub-layers.

18. An engine comprising a sliding engine component having a plastic polymer-based composite layer on a substrate, the composite layer including:
a matrix of plastic polymer-based material of polyamide-imide resin;
a silane material of one of gamma-aminopropyltriethoxysilane or bis-(gamma-trimethoxysilpropyl)amine; and
functionalised graphene nano platelets distributed throughout the matrix;
wherein the functionalised graphene nano platelets comprise graphene nano platelets that are partially functionalised;
wherein one of: (i) the matrix includes —NH2 functional groups and the functionalised graphene nano platelets comprise graphene nano platelets functionalised with —COOH functional groups bonded to the NH2 functional groups; or (ii) the matrix includes —COOH functional groups and the functionalised graphene nano platelets comprise graphene nano platelets functionalised with —NH2 functional groups bonded to the —COOH functional group;
wherein the composite layer comprises 0.01 to 4% wt functionalised graphene nano platelets; and
wherein the silane material is in a range of 3% to 6% volume of the composite layer.

19. A flat sheet element for forming a sliding engine component for an internal combustion engine, comprising a plastic polymer-based composite layer on a substrate, the composite layer including:
a matrix of plastic polymer-based material;
a silane material; and
functionalised graphene nano platelets distributed throughout the matrix;
wherein the functionalised graphene nano platelets comprise graphene nano platelets that are partially functionalised;
wherein the silane material is one of gamma-aminopropyltriethoxysilane or bis-(gamma-trimethoxysilpropyl)amine; and
wherein the plastic polymer material is a polyamide-imide resin.

* * * * *